(12) United States Patent
Joo et al.

(10) Patent No.: US 11,341,842 B2
(45) Date of Patent: May 24, 2022

(54) METERING DATA MANAGEMENT SYSTEM AND COMPUTER READABLE RECORDING MEDIUM

(71) Applicant: Korea Electric Power Corporation, Naju-si (KR)

(72) Inventors: Yong Jae Joo, Daejeon (KR); Jin Ho Shin, Daejeon (KR); Jae Koo Noh, Daejeon (KR)

(73) Assignee: Korea Electric Power Corporation, Naju-si (KR)

( * ) Notice: Subject to any disclaimer, the term of this patent is extended or adjusted under 35 U.S.C. 154(b) by 329 days.

(21) Appl. No.: 16/068,656

(22) PCT Filed: Nov. 21, 2016

(86) PCT No.: PCT/KR2016/013395
§ 371 (c)(1),
(2) Date: Jul. 6, 2018

(87) PCT Pub. No.: WO2018/062614
PCT Pub. Date: Apr. 5, 2018

(65) Prior Publication Data
US 2020/0394904 A1    Dec. 17, 2020

(30) Foreign Application Priority Data
Sep. 27, 2016  (KR) ...................... 10-2016-01213837

(51) Int. Cl.
*G06F 11/00* (2006.01)
*G08C 25/04* (2006.01)
(Continued)

(52) U.S. Cl.
CPC .......... *G08C 25/04* (2013.01); *G06F 11/0709* (2013.01); *G06F 11/0751* (2013.01);
(Continued)

(58) Field of Classification Search
CPC ........ G08C 25/04; G08C 17/02; G08C 19/16; G08C 19/02; G06F 11/0709;
(Continued)

(56) References Cited

U.S. PATENT DOCUMENTS

2004/0076194 A1* 4/2004 Okamoto ........... H04N 21/4385
370/537
2006/0143435 A1* 6/2006 Kwon .................. G06Q 20/382
713/150
(Continued)

FOREIGN PATENT DOCUMENTS

JP   2003141277 A  *  5/2003
JP   2003141277 A     5/2003
(Continued)

OTHER PUBLICATIONS

PCT_ISA_237.
PCT_ISR-210.

*Primary Examiner* — Albert Decady
*Assistant Examiner* — Osman M Alshack
(74) *Attorney, Agent, or Firm* — Foundation Law Group, LLP (57) ABSTRACT

The present invention relates to a metering data management system including a metering data transmission module configured to collect a piece of metering data and generate a message containing the piece of metering data and topic information corresponding to the piece of metering data, a plurality of buffer servers, each of which has a plurality of buffers to which different topics are assigned, configured to store the message in a buffer corresponding to the topic information, a metering data processing module configured to extract the piece of metering data from some of the plurality of buffer servers and process the extracted piece of metering data, and a broker server configured to determine a buffer server, which is an extraction target of the metering (Continued)

data processing module, among the plurality of buffer servers on the basis of state information of the plurality of buffer servers.

8 Claims, 9 Drawing Sheets

(51) Int. Cl.
  *G06F 11/07* (2006.01)
  *G08C 17/02* (2006.01)
  *G08C 19/16* (2006.01)
  *H04L 67/562* (2022.01)

(52) U.S. Cl.
  CPC ............. *G08C 17/02* (2013.01); *G08C 19/16* (2013.01); *H04L 67/2809* (2013.01)

(58) Field of Classification Search
  CPC ............. G06F 11/0751; H04L 67/2809; H04L 67/1008; H04L 67/12
  USPC .................................. 714/766, 799, 807, 819
  See application file for complete search history.

(56) References Cited

U.S. PATENT DOCUMENTS

| | | | | |
|---|---|---|---|---|
| 2012/0054495 | A1* | 3/2012 | Takahashi | H04L 63/126 713/176 |
| 2013/0082641 | A1* | 4/2013 | Nishibayashi | H02J 3/38 320/106 |
| 2015/0084416 | A1* | 3/2015 | Nishibayashi | H02J 3/383 307/12 |
| 2015/0085696 | A1* | 3/2015 | Guo | H04W 48/16 370/254 |
| 2015/0089227 | A1* | 3/2015 | Zhao | H04L 9/3263 713/169 |
| 2016/0278010 | A1* | 9/2016 | Nishibayashi | H04W 52/0219 |
| 2019/0213693 | A1* | 7/2019 | Itaya | G06Q 10/04 |

FOREIGN PATENT DOCUMENTS

| | | | |
|---|---|---|---|
| JP | 2003141277 | E | 5/2003 |
| JP | 2009253823 | A | 10/2009 |
| JP | 2009253823 | E | 10/2009 |
| KR | 20010035031 | A * | 5/2001 |
| KR | 1020000066847 | A | 5/2001 |
| KR | 1020000066847 | E | 5/2001 |
| KR | 101232973 | B | 2/2013 |
| KR | 101232973 | E | 2/2013 |
| KR | 10123170881 | B | 2/2013 |
| KR | 10123170881 | E | 2/2013 |

* cited by examiner

METERING DATA MANAGEMENT SYSTEM AND COMPUTER READABLE RECORDING MEDIUM

TECHNICAL FIELD

Exemplary embodiments of the present invention relate to a metering data management system and a computer-readable recording medium.

BACKGROUND ART

Recently, it is required to manage a piece of metering data collected according to establishment of an advanced meter infrastructure (AMI).

The piece of metering data is a piece of basic data for creating a new energy industry such as calculation of an electricity bill, provision of a real time usage and a fee to a customer, analysis of a demand response (DR), and the like, and thus high reliability is required to manage the piece of metering data.

A conventional metering data management system collects and processes a piece of metering data in a database (DB) link method. However, in a situation in which a capacity for a piece of metering data continues to increase as a metering technique is developed, performance and reliability of the metering data management system is gradually degraded.

DISCLOSURE

Technical Problem

An object of the present invention is to provide a metering data management system and a computer-readable medium which are capable of improving performance and reliability of the metering data management system by collecting and processing a piece of metering data in a distributed manner or a parallel manner.

Technical Solution

In accordance with one aspect of the present invention, a metering data management system includes a metering data transmission module configured to collect a piece of metering data and generate a message containing the piece of metering data and topic information corresponding to the piece of metering, data, a plurality of buffer servers, each of which has a plurality of buffers to which different topics are assigned, configured to store the message in a buffer corresponding to the topic information, a metering data processing module configured to extract the piece of metering data from some of the plurality of buffer servers and process the extracted piece of metering data, and a broker server configured to determine a buffer server, which is an extraction target of the metering data processing module, among the plurality of buffet servers on the basis of state information of the plurality of buffer servers.

The meter data processing module may include a plurality of processing servers, each of which receives a plurality of different assigned topics, configured to extract and process the piece of metering data from a buffer to which a topic the same as the assigned topic is assigned, and a master processing server configured to determine a topic of the piece of metering data, which is to be processed in some of the plurality of processing servers, and assign the determined topic to some of the plurality of processing servers on the basis of state information of the plurality of processing servers.

The meter data transmission module may include a collection server configured to identify the collected piece of metering data and generate the topic information, a data channel configured to temporarily store a generated messages, and a transmission server configured to extract the message temporarily stored in the data channel in a temporary storing order, add meta information used for a processing in the metering data processing module to the extracted message, and transmit the message to which the meta information is added to at least some of the plurality of butter servers.

The metering data processing module may validate an error of the extracted piece of metering data and estimate the error contained in the extracted piece of metering data.

The metering data management system may further include a real-time provision module configured to transmit or output the piece of metering data validated by the metering data processing module in real time, a first analysis module configured to accumulate a validation result of the metering data processing module and generate a piece of first analysis data according to an analysis of the accumulated validation result, and a second analysis module configured to accumulate the piece of metering data validated by the metering data processing module and generate a piece of second analysis data according to an analysis of the accumulated piece of metering data.

The first analysis module may generate meta information used for validation in the metering data processing module on the basis of the analysis of the accumulated validation result, and the metering data transmission module may add the meta information to the message.

The topic information may include at least one from among voltage classification, regional classification, and quality classification of the piece of metering data.

In accordance with another aspect of the present invention, a metering data management system includes a first buffer server having a first buffer and a second buffer, a second buffer server having the second buffer and a third buffer, a third buffer server having the third buffer and the first buffer, a metering data transmission module 100 configured to collect first, second, and third pieces of metering data, generate a first message containing the first piece of metering data and first topic information, transmit the first message to the first buffer, generate a second message containing the second piece of metering data and second topic information, transmit the second message to the second buffer, generate a third message containing the third piece of metering data and third topic information, and transmit the third message to the third buffer, a metering data processing module configured to determine a topic of a piece of metering data, which is to be processed, extract the first piece of metering data from one of the first and second buffer servers when the determined topic corresponds to the first topic information, extract the second piece of metering data from one of the second and third buffer servers when the determined topic corresponds to the second topic information, and extract the third piece of metering data from one of the third and the first buffer servers when the determined topic corresponds to the third topic information, and a broker server configured to determine a buffer server, which is an extraction target of the metering data processing module, among the first to third of buffer servers on the basis of state information of the first to third of bullet servers.

In accordance with still another aspect of the present in a computer-readable medium on which commands executable by a processor for executing a method is recorded, wherein the method may include-collecting a piece of metering data, identifying the piece of metering data and generating topic information corresponding to the piece of metering data, generating a message containing the piece of metering data and the topic information, transmitting the message to a buffer server, corresponding to the topic information, among a plurality of buffer servers, each of which has a plurality of buffers to which different topics are assigned, determining a topic which is to be processed, assigning the determined topic to some of a plurality of processing servers, and determining a buffer server to transmit the piece of metering data to some of the plurality of processing servers among the plurality of buffer servers on the basis of state information of the plurality of buffer servers.

Advantageous Effects

In accordance with the present invention, it is possible to prevent degradation of performance and reliability of a metering data management system, which occurs as a capacity of a piece of metering data increases.

Further, the metering data management system according to exemplary embodiments of the present invention can efficiently perform metering data management by being flexibly extended or reduced according to a capacity change of a piece of metering data, and even though failures occur in some servers, the metering data management system can prevent a loss of a piece of data and interruption of data management to stably perform the metering data management.

MODE FOR INVENTION

In the following detailed description, reference is made to the accompanying drawings that illustrates, by way of illustration, specific embodiments in which the invention may be practiced. It should be understood that various embodiments of the present invention, although different, are not necessarily mutually exclusive. For example, specific forms, structures, and characteristics described herein in connection with one embodiment may be implemented within other embodiments without departing from the spirit and scope of the present invention. Further, it should be understood that the location or arrangement of individual elements within each disclosed embodiment may be modified without departing from the scope of the present invention. The following detailed description, therefore, is not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, exemplary embodiments of the present invention will be described in detail with reference to the accompanying drawings so as to enable those skilled in the art to which the present invention pertains to practice the present invention.

Figure 1:
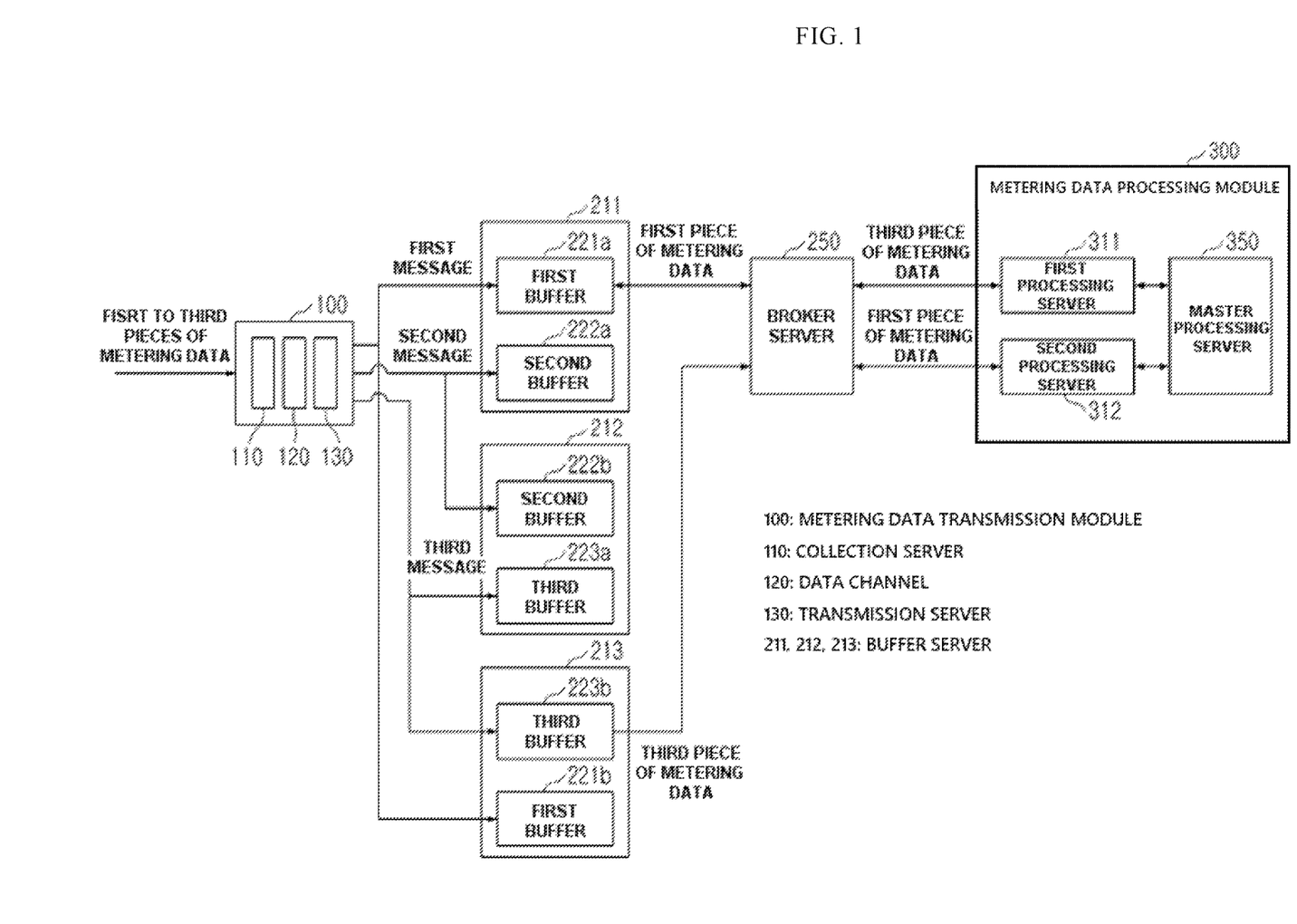
FIG. 1 is a diagram illustrating a metering data management system according to one embodiment of the present invention.

FIG. 1 is a diagram illustrating a metering data management system according to one embodiment of the present invention.

Referring to FIG. 1, a metering data management system according to one embodiment of the present invention may include a metering data transmission module 100, a plurality of buffer servers 211, 212, and 213, a broker server 250, and a metering data processing module 300.

The metering data transmission module 100 may collect a piece of metering data and may generate topic information corresponding to the piece of metering data and a message containing the piece of metering data. Here, the piece of metering data may be implemented as a piece of load profile (LP) data, and the piece of metering data may be transmitted through protocols such as a simple object access protocol (SOAP), a secure copy protocol (SCP), a polling protocol, and the like.

Here, the topic information may be intermediate information for the metering data management system to process the piece of metering data in a distributed manner or a parallel manner. For example, a topic may represent one of a plurality of sets different in at least one among a voltage classification, a regional classification, and a quality classification of the piece of metering data. For example, a meter type reading a piece of meter data corresponding to a first topic may be a standard type, a meter type reading a piece of metering data corresponding to a second topic may be an E-type, a meter type reading a piece of metering data corresponding to a third topic may be a G-Type, and a meter type reading a piece of metering data corresponding to a fourth topic may be an EA-Type.

For example, the metering data transmission module 100 may collect first, second, and third pieces of metering data, generate a first message containing the first piece of metering data and first topic information, transfer the first message to first buffers 221*a* and 221*b*, generate a second message containing the second piece of metering data and second topic information, transfer the second message to second buffers 222*a* and 222*b*, generate a third message containing the third piece of metering data and third topic information, and transfer the third message to third buffers 223*a* and 223*b*. That is, the metering data transmission module 100 may transfer the pieces of metering data collected according to the topic information to different targets.

The metering data transmission module 100 may include a collection server 110, a data channel 120, and a transmission server 130.

The collection server 110 may generate topic information by identifying a collected piece of metering data. Here, identification of the piece of metering data may be an encoding or decoding of some piece of data contained in the piece of metering data or may be validation of a pattern of the piece of metering data.

The data channel 120 may temporarily store a generated message and may be connected to the collection server 110 and the transmission server 130.

The transmission server 130 may extract the message temporarily stored in the data channel 120 in the temporary storing order, add meta information used for a processing in the metering data processing module 300 to the extracted message, and transfer the message to which the meta information is added to at least some of the plurality of buffer servers 211, 212, and 213.

Each of the plurality of buffer servers 211, 212 and 213 may have at least some of the plurality of buffers 221*a*, 221*b*, 222*a*, 222*b*, 223*a*, and 223*b* to which different topics are assigned and may store a received message in a buffer corresponding to topic information contained in the received message.

For example, when the first buffer server 211 has the first buffer 221*a* and the second buffer 222*a*, a message containing topic information corresponding to a first topic may be stored in the first buffer 221*a*, and a message containing topic information corresponding to a second topic may be stored in the second buffer 222*a*.

For example, when the second butter server 212 has the second buffer 222*b* and the third buffer 223*a*, a message containing the topic information corresponding to the second topic may be stored in the second buffer 222*b*, and a message containing topic information corresponding to a third topic may be stored in the third buffer 223*a*.

For example, when the third buffer server 213 has the third buffer 223*a* and the first butter 221*b*, a message containing the topic information corresponding to the third topic may be stored in the third buffer 223*b*, and a message containing the topic information corresponding to the first topic may be stored in the first buffer 221*b*.

Here, the message containing the topic information corresponding to the first topic may be stored in both the first buffer 221*a* included in the first buffer server 211 and the first buffer 221*b* included in the third buffer server 213. Similarly, the message containing the topic information corresponding to the second topic may be stored in both the second buffer 222*a* included in the first buffer server 211 and the second buffer 222*b* included in the second buffer server 212. Similarly, the message containing the topic information corresponding to the third topic may be stored in both the third buffer 223*a* included in the second buffer server 212 and the third buffer 223*b* included in the third buffer server 213.

That is, the plurality of buffer servers 211, 212, and 213 may store messages in the buffers in a distributed manner or a parallel manner. Accordingly, the plurality of buffer servers 211, 212, and 213 may store, receive, and transfer messages in a balanced manner.

The broker server 250 may determine a buffer server which is an extraction target of the metering data processing module 300 among the plurality of buffer servers 211, 212, and 213 on the basis of state information of the plurality of buffer servers 211, 212, and 213. Here, the state information may include at least one from among a central processing unit (CPU) load of each buffer server, a memory storage space thereof, a disk space thereof, and whether a failure occurs in each buffer server. In order to determine the buffer server which is an extraction target, the broker server 250 may manage a network address, topic assignment information, and/or stored message information per buffer of each of the plurality of buffer servers 211, 212, and 213.

When a failure occurs in the second buffer server 212, the broker server 250 may receive the third piece of metering data from the third buffer server 213 instead of the second buffer server 212 and may transfer the third piece of metering data to the metering data processing module 300. Thereafter, the broker server 250 may receive the first piece of metering data from the first buffer server 211 instead of the third buffer server 213 and may transfer the first piece of metering data to the metering data processing module 300.

That is, even when a failure occurs in some of the buffer servers, the broker server 250 may smoothly transfer the piece of metering data to the metering data processing module 300 and may collectively control the plurality of buffer servers 211, 212, and 213 to store and transfer the piece of metering data in a distributed manner or in a parallel manner.

The metering data processing module 300 may extract a piece of metering data from some of the plurality of buffer servers 211, 212, and 213 and process the extracted piece of metering data. Here, the processing of the piece of metering data may include validation, estimation, and editing (VEE) on the piece of metering data. For example, the metering data processing module 300 may validate and estimate an error of the extracted piece of metering.

The metering data processing module 300 may include a plurality of processing servers 311 and 312 and a master processing server 350.

Each of the plurality of processing servers 311 and 312 may receive a plurality of assigned different topics and extracts and processes a piece of metering data from a buffer to which a topic the same as the assigned topic is assigned. Each of the plurality of processing servers 311 and 312 may include a unit configured to process extraction and loading of a piece of data, and a unit configured to validate and confirm the piece of data.

The master processing server 350 may determine a topic of the piece of metering data, which will be processed by some of the plurality of processing servers 311 and 312, and may assign the determined topic to some of the plurality of processing servers 311 and 312 on the basis of state information of the plurality of processing servers 311 and 312. In order to determine and/or assign a topic, the master processing server 350 may distribute and collect (map and reduce) performing tasks of the plurality of processing servers 311 and 312, manage schedules of the performing tasks, verify the state information of the plurality of processing servers 311 and 312, and uniformly distribute the performing tasks to the plurality of processing servers 311 and 312.

When the master processing server 350 determines a topic corresponding to a third topic as a topic of the piece of metering data, which will be processed first, the master processing server 350 may determine whether which of a first processing server 311 and a second processing server 312 is not busy. When the first processing server 311 is relatively less busy, the roaster processing server 350 may assign the third topic to the first processing server 311.

Thereafter, the first processing server 311 may receive and process the third piece of metering data from the broker server 250 or the third buffer 223b. Then, the master processing server 350 may determine a first topic of the piece of metering data as a topic which will be processed second. Afterward, the master processing server 350 may assign the first topic to the second processing server 312. Then, the second processing server 312 may receive and process the first piece of metering data from the broker server 250 or the first buffer 221a.

That is, the master processing server 350 may collectively control the plurality of processing servers 311 and 312 to receive and process the piece of metering data in a distributed manner or a parallel manner.

Meanwhile, in order to prevent a server failure or a data loss, the collection server 110, the data channel 120, the transmission server 130, the broker server 250, and or the master processing server 350 may be duplicated.

Figure 2:
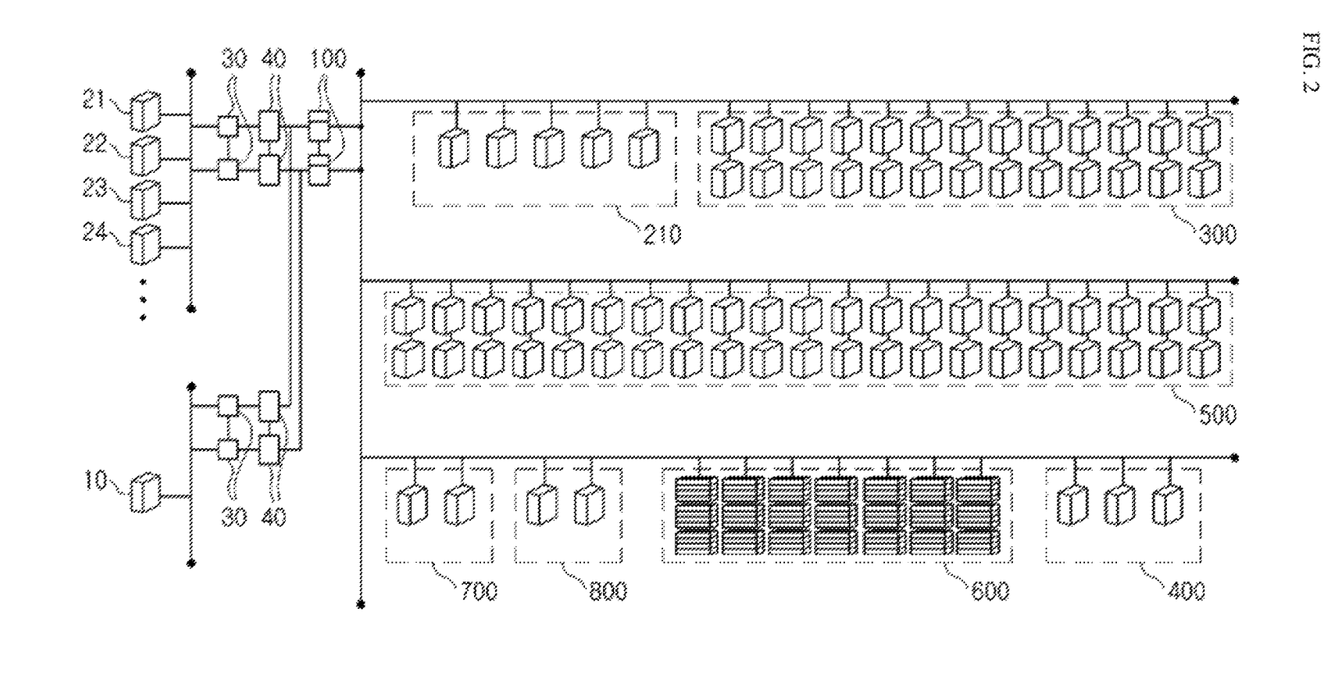
FIG. 2 is a diagram illustrating an architecture of the metering data management system according to one embodiment of the present invention.

FIG. 2 is a diagram illustrating an architecture of the metering data management system according to one embodiment of the present invention.

Referring to FIG. 2, the metering data management system according to one embodiment of the present invention may further include a real-time provision module 400, a first analysis module 500, a second analysis module 600, a system management server 700, and a link server 800.

The piece of metering data generated at a duplicated integration server 10 and/or duplicated regional offices 21, 22, 23, and 24 may be converted into a piece of LP data by a convener 30. The convened piece of metering data may be transmitted to the metering data transmission module 100 according to a protocol such as SOAP, SCP, a polling protocol, or the like through a network connector 40.

The real-time provision module 400 may transmit or output the piece of metering data validated by the metering data processing module 300 to the outside in real time.

The first analysis module 500 may accumulate validation results of the metering data processing module 300 and generate a piece of first analysis data according to an analysis of the accumulated validation results. Further, the first analysis module 500 may generate meta information used for the validation of the metering data processing module 300 on the basis of the analysis of the accumulated validation results. The meta information may be added to a message which is subsequently generated in the metering data transmission module 100. That is, the first analysis module 500 may generate and feedback the meta information to the metering data transmission module 100 so as to reflect the analysis result of the first analysis module 500 to the metering data processing module 300.

For example, the first analysis module 500 may include a common data cluster, a metering data cluster, and a master analysis server, and the first analysis module 500 may store and manage collection meta information so as to manage reference information (e.g., customer information, contract information, instrument information, and the like) for data validation, and calculation and confirmation of a section value.

Further, in order to speed up a provision speed for the piece of metering data of the real-time provision module 400, the first analysis module 500 may store the piece of metering data in a distributed manner or a parallel manner and transmit the piece of metering data to the real-time provision module 400 in a distributed manner or a parallel manner. Here, the metering data cluster may store the piece of metering data in a distributed manner or a parallel manner by utilizing the topic information or the meta information. Further, the master analysis server may manage storing and transmission of the metering data cluster on the basis of stale information of the metering data cluster.

The second analysis module 600 may accumulate the piece of metering data validated by the metering data processing module 300 and generate a piece of second analysis data according to an accumulated analysis of the piece of metering data. For example, the second analysis module 600 may perforin an analysis which requires a large amount of operations such as a demand response (DR) analysis by performing a big data analysis operation in the long term.

Further, the second analysis module 600 may perform advanced statistical analysis functions, such as a multi-dimensional analysis, a time series pattern analysis, prevention of cancellation/steal electricity and may transmit the analysis result to the real-time provision module 400. The metering data management system according to one embodiment of the present invention may efficiently stably analyze and provide the piece of metering data by duplicating the analysis operation.

The system management server 700 may monitor an overall state of the metering data management system according to one embodiment of the present invention.

The link server 800 may manage a linked operation between the servers.

Meanwhile, the metering data management system according to one embodiment of the present invention may be applied not only to metering data management but also to integrated monitoring or diagnosis of a power plant. Since the power plant includes a plurality of sensors for sensing a temperature, humidity, a pressure, vibration, and the like and operation information on a plurality of generators, the metering data management system may replace the piece of metering data with pieces of sensed data of the sensors and the operation information, which are included in the power plant, to manage a piece of data in a distributed manner or a parallel manner.

Figure 3:
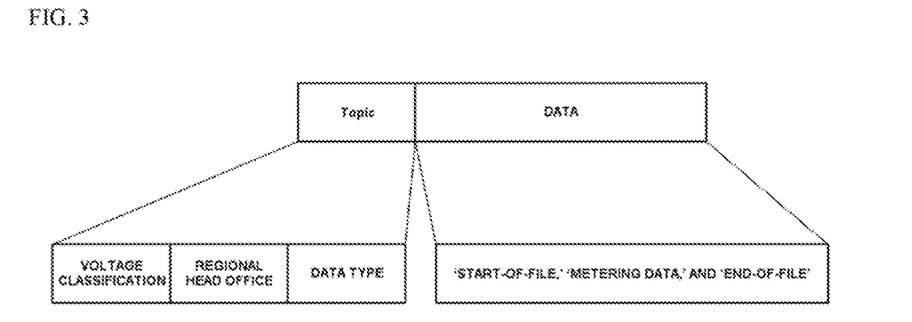
FIG. 3 is a diagram exemplifying a message generated by the metering data management system according to one embodiment of the present invention.

FIG. 3 is a diagram exemplifying a message generated by the metering data management system according to one embodiment of the present invention.

Referring to FIG. 3, the topic information may include at least one from among voltage classification, regional classification, and quality classification of the piece of metering data. Further, start-of file information and end-of-file information may be respectively added to one end and the other end of the piece of metering data.

Here, the start-of file information is information indicating a start of a file. For example, a string of the start-of file information may be [S, CN_FEP_000001_LE_20151117_1830_184457, L, SU, 1950, L], and the string may be summarized in the following Table 1.

TABLE 1

| Order | Item | Length | Description |
| --- | --- | --- | --- |
| 1 | 'S' | 1 | Fixed and Meaning start-of-file |
| 2 | File Name | Variable | Original file name transmitted from FEP server |
| 3 | Voltage Classification | 1 | 'H' (high voltage) and 'L' (low voltage) |
| 4 | Head Office Code | 2 | Using standard code system such as SU (Seoul), NS (South Seoul), and the like |

TABLE 1-continued

| Order | Item | Length | Description |
|---|---|---|---|
| 5 | Regional Code | 4 | Using standard code system such as '3970' (Seoul), '3850' (South Seoul), and the like |
| 6 | Data type | 1 | Using delined codes such as 'L' (LP), 'E' (electricity quality), and the like |

For example, the collection server included in the metering data management system may store the start-of file information in a data channel and sequentially store a plurality of pieces of metering data strings in the data channel. Here, each of the strings may have a form in which a file name is added to a parsing result string for a single actual line of a data file.

The end-of-file information is information indicating that all the plurality of pieces of metering data are stored in the data channel. For example, a string of the end-of-file information may be [E, CN_FEP_000001_LE_20151117_1830_184457, 28940, 28940, 0, 1950], and the string may be summarized in the following Table 2.

TABLE 2

| Oder | Item | Length | Description |
|---|---|---|---|
| 1 | 'E' | 1 | Fixed and Meaning end-of-file |
| 2 | File Name | Variable | File name generated at regional adapter server |
| 3 | Total Number | Variable | Number of total pieces of data in file |
| 4 | Success Number | Variable | Number of pieces of successfully processed data among number of total pieces of data |
| 5 | Failure Number | Variable | Number of pieces of unsuccessfully processed data among number of total pieces of data |
| 6 | Regional Code | 4 | Using standard code system such as '3970' (Seoul), '3850' (South Seoul), and the like |

Figure 4:
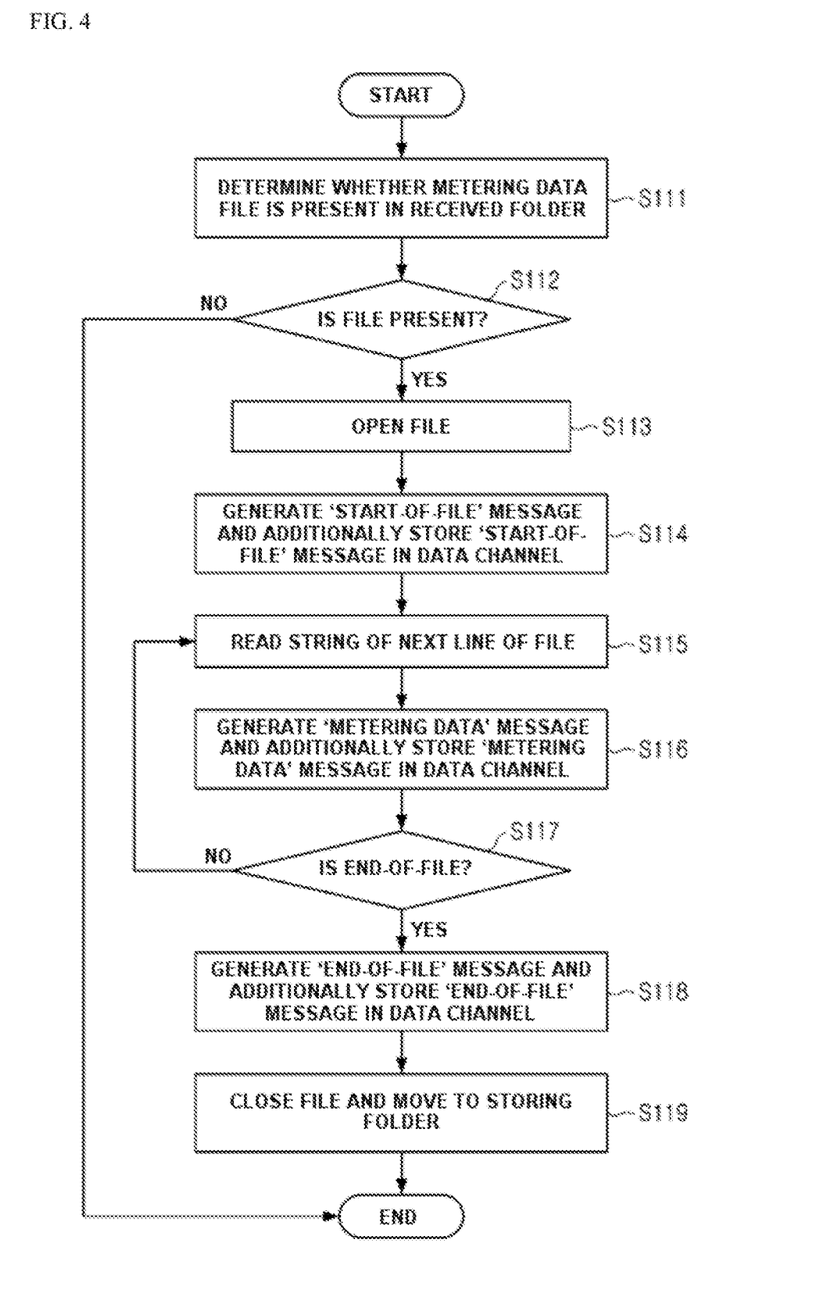
FIG. 4 is a flowchart illustrating an operation of a collection server which is includable in the metering data management system according to one embodiment of the present invention.

FIG. 4 is a flowchart illustrating an operation of the collection server which is includable in the metering data management system according to one embodiment of the present invention.

Referring to FIG. 4, the collection server may verify whether a metering data file is present in a received folder (S111 and S112), open the metering data file when the metering data file is determined as being present (S113), generate a file start message containing start-of-file information to additionally store the file start message in the data channel (S114), sequentially read a string of the metering data file per line (S115), generate a metering data message to additionally store the metering data message in the data channel (S116), verify whether an end-of-file is detected (S117), generate an end-of-file message containing end-of-file information when the end-of-file is determined as being detected to additionally store the end-of-file message in the data channel (S118), and close the metering data file to move to a stored folder (S119). The above-described operations S111 to S119 may be processed as a single independent thread or may be simultaneously executed as a plurality of threads in the collection server.

Figure 5:
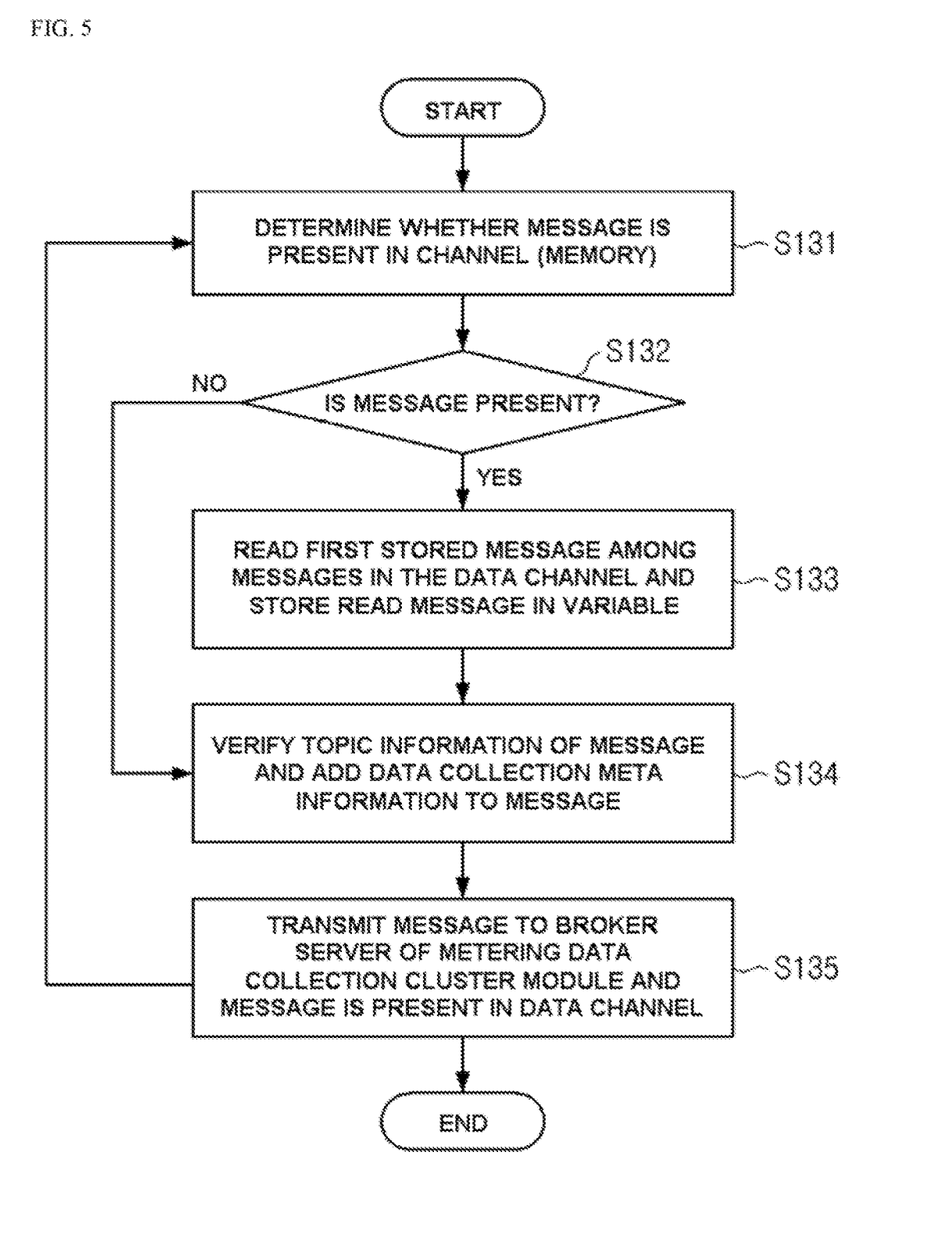
FIG. 5 is a flowchart illustrating an operation of a transmission server which is includable in the metering data management system according to one embodiment of the present invention.

FIG. 5 is a flowchart illustrating an operation of a transmission server which is includable in the metering data management system according to one embodiment of the present invention.

Referring to FIG. 5, the transmission server may verify whether messages are present in the data channel (S131 and S132), read a first stored message among the messages in the data channel when the messages are determined as being present (S133), verify topic information of the read message to add data collection meta information to the read message (S134), and transmit the message to which the data collection meta information is added to the broker server, (S135) to delete the corresponding message existing in the data channel.

The above-described operations S131 to S135 may be processed as a single independent thread or may be simultaneously executed as a plurality of threads in the transmission server.

The meta information may be summarized in the following Table 3.

TABLE 3

| Item | Description | NULL available |
|---|---|---|
| ObjectID | Automatically generated unique identification value | N |
| File Name | Original data file name received from FEP server | N |
| Head Office Code | Using standard code system such as SU (Seoul), NS (South Seoul), and the like | N |
| Voltage Classification | 'H': high voltage and 'L': low voltage | N |
| Collection Type | using defined codes such as 'L' (LP), 'E' (electricity quality), and the like | N |
| Collection Number | Number of stored pieces of data | Y |
| Whether loading is completed | Whether reception and storing of overall messages including data files are completed | Y |
| Whether section value is calculated | Whether section value calculation task (profiling) is completed | Y |
| Original generated data and time | Date and time when meta information is initially generated | Y |
| Last updated data and time | Date and time when meta information is lastly updated | Y |
| Data and time of loading completion | Date and time when reception and storing of pieces of data for all messages are completed | Y |
| Whether primary validation is completed | 'Y' when primary validation task is completed | Y |
| Whether secondary validation is completed | 'Y' when secondary validation task is completed | Y |
| Date and time of primary validation completion | Data and time when primary validation task is completed | Y |
| Date and time of secondary validation completion | Data and time when secondary validation task is completed | Y |
| Whether 'end-of-file' is received | 'Y' when message of 'end-of-file' is received | Y |
| Number | Total number counted in data transmission module | Y |

TABLE 3-continued

| Item | Description | NULL available |
|---|---|---|
| Normal number | Number of successful processes in data transmission module | Y |
| Failure number | Number of failure processes in data transmission module | Y |
| File collection number | Sequential number assigned in file unit | Y |

Figure 6:
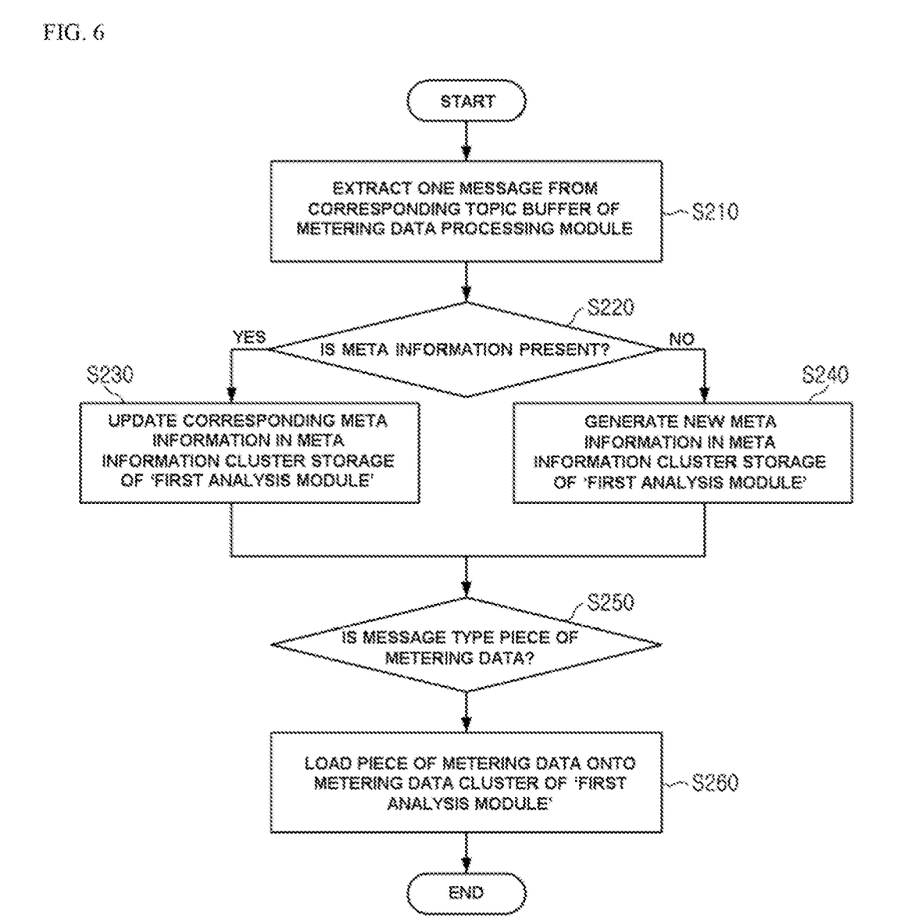
FIG. 6 is a flowchart illustrating an operation of a processing server which is includable in the metering data management system according to one embodiment of the present invention.

FIG. 6 is a flowchart illustrating an operation of the processing server which is includable in the metering data management system according to one embodiment of the present invention.

Refusing to FIG. 6, the processing server may extract one message from a corresponding topic buffer of the metering data processing module (S210), determine whether meta information is present in the extracted message (S220), store the meta information in a meta information cluster storage of the first analysis module when the meta information is determined as being present (S230), generate new meta information in the meta information cluster storage of the first analysis module when the meta information is determined as not being present (S240), determine whether a message type is a type of the piece of metering data (S250), load the piece of metering data onto a metering data cluster of the first analysis module when the message type is determined as not being a type of the piece of metering data (S260).

The above-described operations S210 to S260 may be processed as a single independent thread or may be simultaneously executed as a plurality of threads in the processing server.

Figure 7:
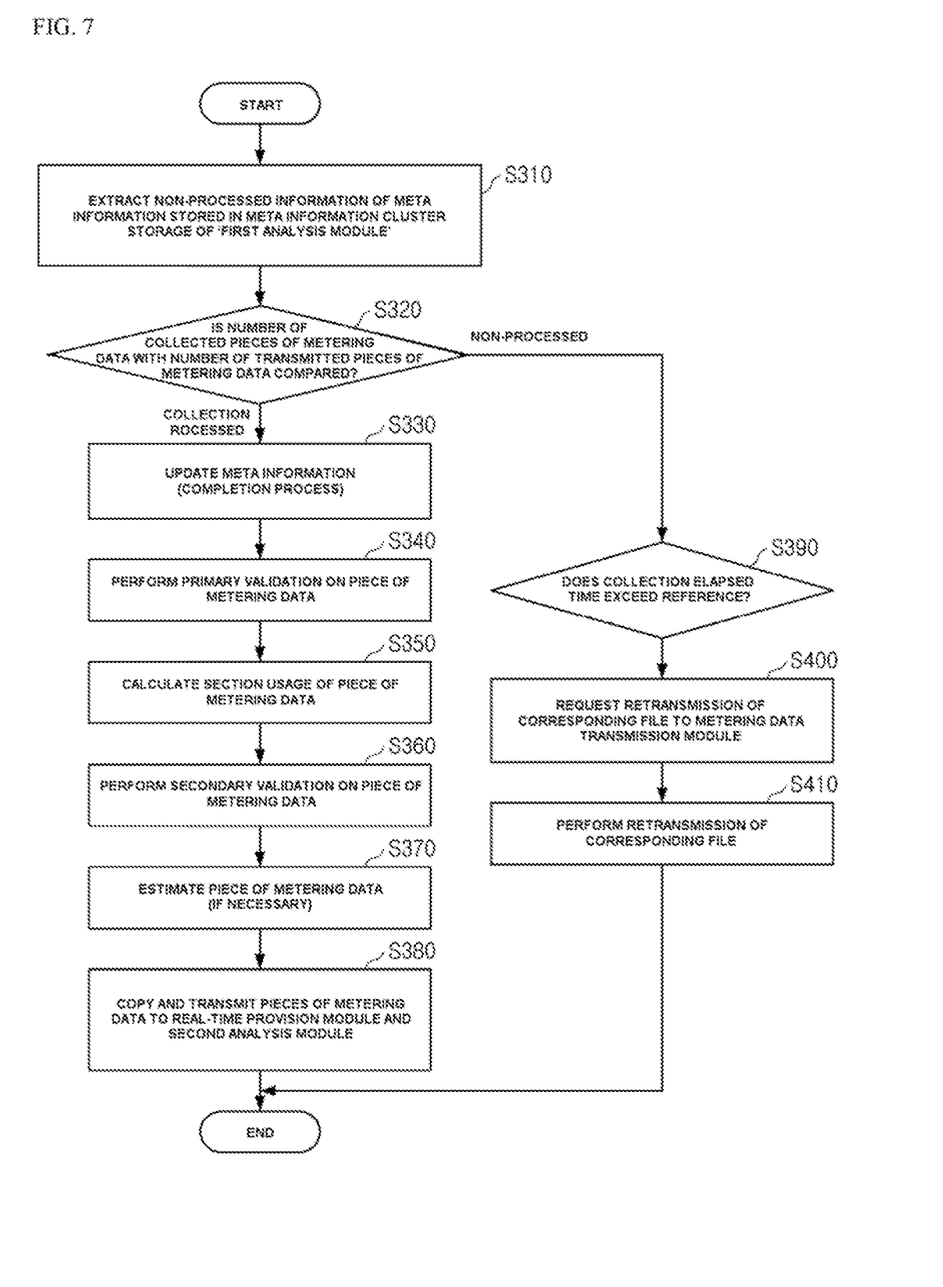
FIG. 7 is a flowchart illustrating metering data validation of the processing server which is includable in the metering data management system according to one embodiment of the present invention.

FIG. 7 is a flowchart illustrating metering data validation of the processing server which is includable in the metering data management system according to one embodiment of the present invention.

Referring to FIG. 7, the processing server may extract non-processed information of the meta information stored in the meta information cluster storage of the first analysis module (S310), compare the number of collected pieces of metering data with the number of transmitted pieces of metering data (S320), update the meta information when collection of the pieces of metering data is completed (S330), primarily validate the pieces of metering data (S340), calculate a section usage of the pieces of metering data (S350), secondarily validate the pieces of metering data (S360), estimate the pieces of metering data if necessary (S370), copy and transmit the pieces of metering data to the real-time provision module and the second analysis module (S380), determine whether a collection elapsed time exceeds a reference in a state in which the collection of the pieces of metering data is not completed (S390), request retransmission of a corresponding file to the metering data transmission module (S400), and retransmit the corresponding file (S410).

Here, the estimating of the pieces of metering data (S370) may primarily perform automatic estimation, and when the automatic estimation is not possible, estimation may be secondarily performed by a statistical method.

The above-described operations S310 to S410 may be processed as a single independent thread or may be simultaneously executed as a plurality of threads in the processing server.

Figure 8:
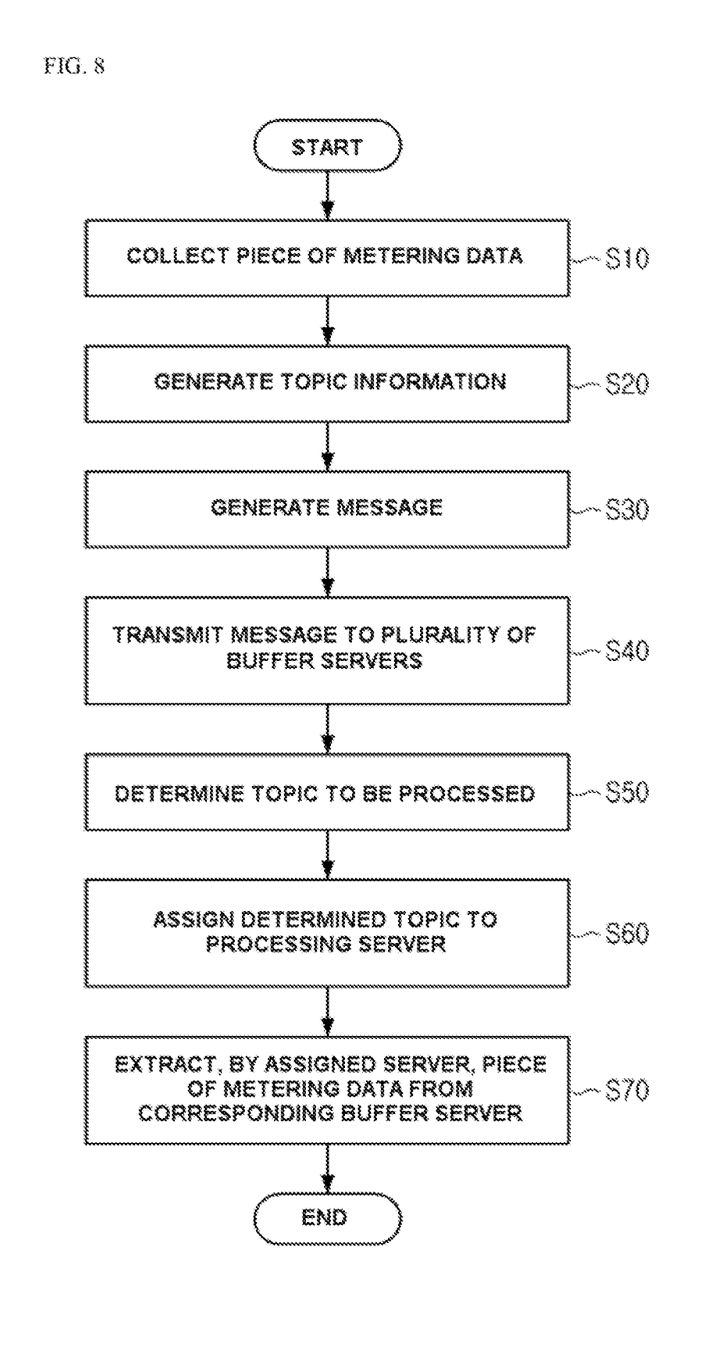
FIG. 8 is a flowchart illustrating a method recorded on a computer-readable recording medium according to one embodiment of the present invention.

FIG. 8 is a flowchart illustrating a method recorded on a computer-readable recording medium according to one embodiment of the present invention.

Referring to FIG. 8, the method recorded on a computer-readable recording medium according to one embodiment of the present invention may include collecting a piece of metering data (S10), generating topic information (S20), generating a message (S30), transmitting the message to a plurality of buffer servers (S40), determining a topic which will be processed (S50), assigning the determined topic to the processing server (S60), extracting, by the processing server, the piece of metering data from a corresponding buffer server (S70).

Figure 9:
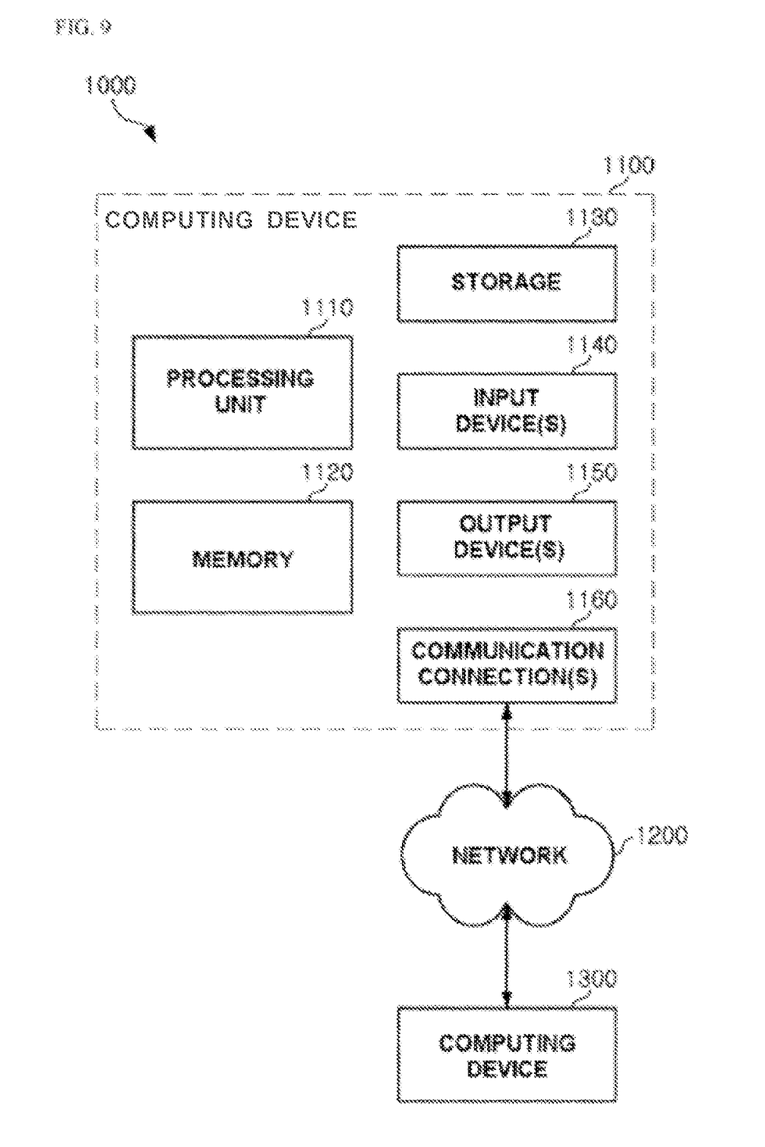
FIG. 9 is a diagram illustrating an exemplary computing environment in which one or more embodiments disclosed herein are implementable.

For example, the computer-readable recording medium may be read through a storage of a computing environment illustrated in FIG. 9. The computing environment may be implemented with a system management server and/or a linked server, which is included in the metering data management system.

FIG. 9 is a diagram illustrating an exemplary computing environment in which one or more embodiments disclosed herein are implementable, and FIG. 9 illustrate an example of a system 1000 including a computing device 1100 configured to implement one or more of the above-described embodiments. For example, the computing device 1100 may include a personal computer, a server computer, a hand-held or laptop device, a mobile device (a mobile phone, a personal digital assistant (PDA), a media player, and the like), a multiprocessor system, a consumer electronic device, a minicomputer, a mainframe computer, and a distributed computing environment including any systems or devices as described above, but the present invention is not limited thereto.

The computing device 1100 may include at least one processing unit 1110 and at least one memory 1120. Here, the processing unit 1110 may include a central processing unit (CPU), a graphics processing unit (GPU), a microprocessor, an application specific integrated circuit (ASIC), and a field programmable gate array (FPGA) and may have a plurality of cores. The memory 120 may be a volatile memory (e.g., a random access memory (RAM) and the like), a non-volatile memory (e.g., a read only memory (ROM), a flash memory, and the like), or a combination thereof.

Further, the computing device 1100 may include an additional storage 1130. The storage 1130 may include a magnetic storage, an optical storage, and the like, but the present invention is not limited thereto. The storage 1130 may store computer-readable commands for implementing one or more embodiments disclosed herein, and other computer-readable commands for implementing an operating system, an application program, and the like. The computer-readable commands stored in the storage 1130 may be loaded onto the memory 1120 so as to be executed by the processing unit 1110.

Further, the computing device 1100 may include input device(s) 1140 and output devices) 1150. For example, the input devices 1140 may include a keyboard, a mouse, a pen, a voice input device, a touch input device, an infrared camera, a video input device, or any other input device. For example, the output device(s) 1150 may include one or more displays, speakers, printers, or any other output devices. Further, the computing device 1100 may use an input device or an output device included in another computing device as the input device(s) 1140 or the output device(s) 1150.

Furthermore, the computing device 1100 may include communication connection(s) 1160 configured to allow communication with other devices (e.g., a computing device 1300) via a network 1200. Here, the communication connection(s) 1160 may include a modem, a network interface card (NIC), an integrated network interface, a radio frequency transmitter/receiver, an infrared port, a universal serial bus (USB) connection, or other interface for connecting the computing device 1100 to another computing device. Further, the communication connection(s) 1160 may include a wired connection or a wireless connection.

Each component of the above-described computing device 1100 may be connected by various interconnects (e.g., a peripheral component interconnect (PCI), a USB, a firmware (IEEE 1394), an optical bus structure, and the like) and may be interconnected by a network.

The terms "component," "module," "system," "interface," and the like used herein generally refer to hardware, a combination of hardware and software, software, or a computer-related entity which is software that is being executed. For example, a component may be a process running on a processor, a processor, an object, an executable, an execution thread, a program, and/or a computer, but the present invention is not limited thereto. For example, both the controller and the application running on the controller may be components. One or more components may be present within a process and/or an execution thread, may be localized on a single computer, and may be distributed among two or more computers.

While the exemplary embodiments of the present in has been described, the present invention is not limited to these exemplary embodiments, and various modifications can be devised by those skilled in the art to which the present invention pertains without departing from the gist of the present invention as defined by the appended claims.

The invention claimed is:

1. A metering data management system comprising:
   a metering data transmission module configured to collect a piece of metering data and generate a message containing the piece of metering data and topic information corresponding to the piece of metering data;
   a plurality of buffer servers, each of which has a plurality of buffers to which different topics are assigned, configured to store the message in a buffer corresponding to the topic information;
   a metering data processing module configured to extract the piece of metering data from some of the plurality of buffer servers and process the extracted piece of metering data; and
   a broker server configured to determine a buffer server, from which the metering data processing module is going to extract the piece of metering data, among the plurality of buffer servers on the basis of state information of the plurality of buffer servers,
   wherein the meter data processing module includes:
   a plurality of processing servers, each of which receives plurality of different assigned topics, configured to extract and process the piece of metering data from a buffer to which a topic the same as the assigned topic is assigned; and
   a master processing server configured to determine a topic of the piece of metering data, which is to be processed in some of the plurality of processing servers, and assign the determined topic to some of the plurality of processing servers on the basis of state information of the plurality of processing servers.

2. The metering data management system of claim 1, wherein the meter data transmission module includes:
   a collection server configured to identify the collected piece of metering data and generate the topic information;
   a data channel configured to temporarily store a generated message; and
   a transmission server configured to extract the message temporarily stored in the data channel in a temporary storing order, add meta information used for a processing in the metering data processing module to the extracted message, and transmit the message to which the meta information is added to at least some of the plurality of buffer servers.

3. The metering data management system of claim 1, wherein the metering data processing module validates an error of the extracted piece of metering data and estimates the error contained in the extracted piece of metering data.

4. The metering data management system of claim 3, further comprising:
   a real-time provision module configured to transmit or output the piece of metering data validated by the metering data processing module in real time;
   a first analysis module configured to accumulate a validation result of the metering data processing module and generate a piece of first analysis data according to an analysis of the accumulated validation result; and
   a second analysis module configured to accumulate the piece of metering data validated by the metering data processing module and generate a piece of second analysis data according to an analysis of the accumulated piece of metering data.

5. The metering data management system of claim 4, wherein:
   the first analysis module generates meta information used for validation in the metering data processing module on the basis of the analysis of the accumulated validation result, and
   the metering data transmission module adds the meta information to the message.

6. The metering data management system of claim 1, wherein the topic information includes at least one from among voltage classification, regional classification, and quality classification of the piece of metering data.

7. A metering data management system comprising:
   a first buffer server having a first buffer and a second buffer;
   a second buffer server having the second buffer and a third buffer;
   A third buffer server having the third buffer and the first buffer;
   a metering data transmission module configured to collect first, second, and third pieces of metering data, generate a first message containing the first piece of metering data and first topic information, transmit the first message to the first buffer, generate a second message containing the second piece of metering data and second topic information, transmit the second message to the second buffer, generate a third message containing the third piece of metering data and third topic information, and transmit the third message to the third buffer;
   a metering data processing module configured to determine a topic of a piece of metering data, which is to be processed, extract the first piece of metering data from one of the first and second buffer servers when the determined topic corresponds to the first topic information, extract the second piece of metering data from one of the second and third buffer servers when the determined topic corresponds to the second topic information, and extract the third piece of metering data from one of the third and the first buffer servers when the determined topic corresponds to the third topic information; and a broker server configured to determine a buffer server, from which the metering data processing module is going to extract the piece of metering data, among the first to third of buffer servers on the basis of state information of the first to third of buffer servers, wherein the meter data processing module includes:

a plurality of processing servers, each of which receives plurality of different assigned topics, configured to extract and process the piece of metering data from a buffer to which a topic the same as the assigned topic is assigned; and a master processing server configured to determine a topic of the piece of metering data, which is to be processed in some of the plurality of processing servers, and assign the determined topic to some of the plurality of processing servers on the basis of state information of the plurality of processing servers.

8. A non-transitory computer-readable recording medium having instructions stored thereon for execution by a processor to perform:

collecting a piece of metering data;

identifying the piece of metering data and generating topic information corresponding to the piece of metering data;

generating a message containing the piece of metering data and the topic information;

transmitting the message to a buffer server, corresponding to the topic information, among a plurality of buffer servers, each of which has a plurality of buffers to which different topics are assigned;

determining a topic of the piece of metering data which is to be processed;

assigning the determined topic to some of a plurality of processing servers on the basis of stat information of the plurality of processing servers; and determining a buffer server, to transmit the piece of metering data to some of the plurality of processing servers, among the plurality of buffer servers on the basis of state information of the plurality of buffer servers, extracting and processing the piece of metering data from a buffer to which a topic the same as the assigned topic is assigned in the buffer server.

* * * * *